Aug. 10, 1954 R. C. WILLIAMS 2,685,774
GRASS MULCHING DEVICE FOR LAWNMOWERS
Filed March 25, 1950 2 Sheets-Sheet 2
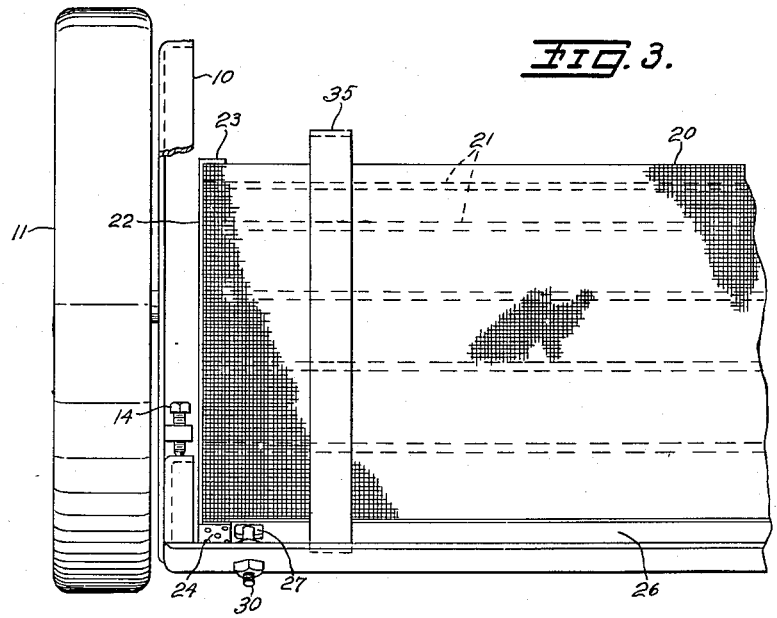
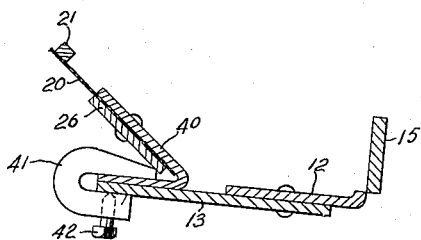
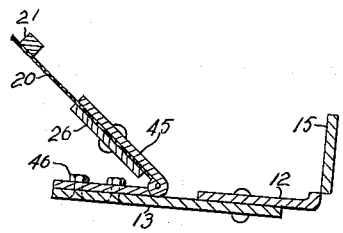
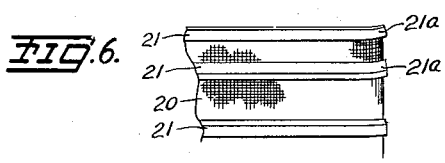
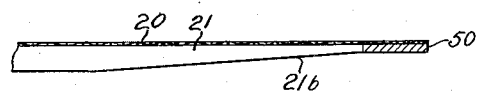
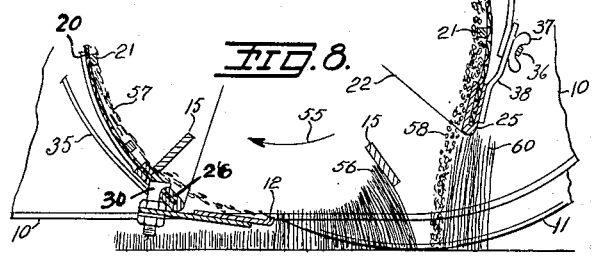
INVENTOR.
Ray C. Williams
BY
Cook and Ackermerhorn
ATTORNEYS Patented Aug. 10, 1954

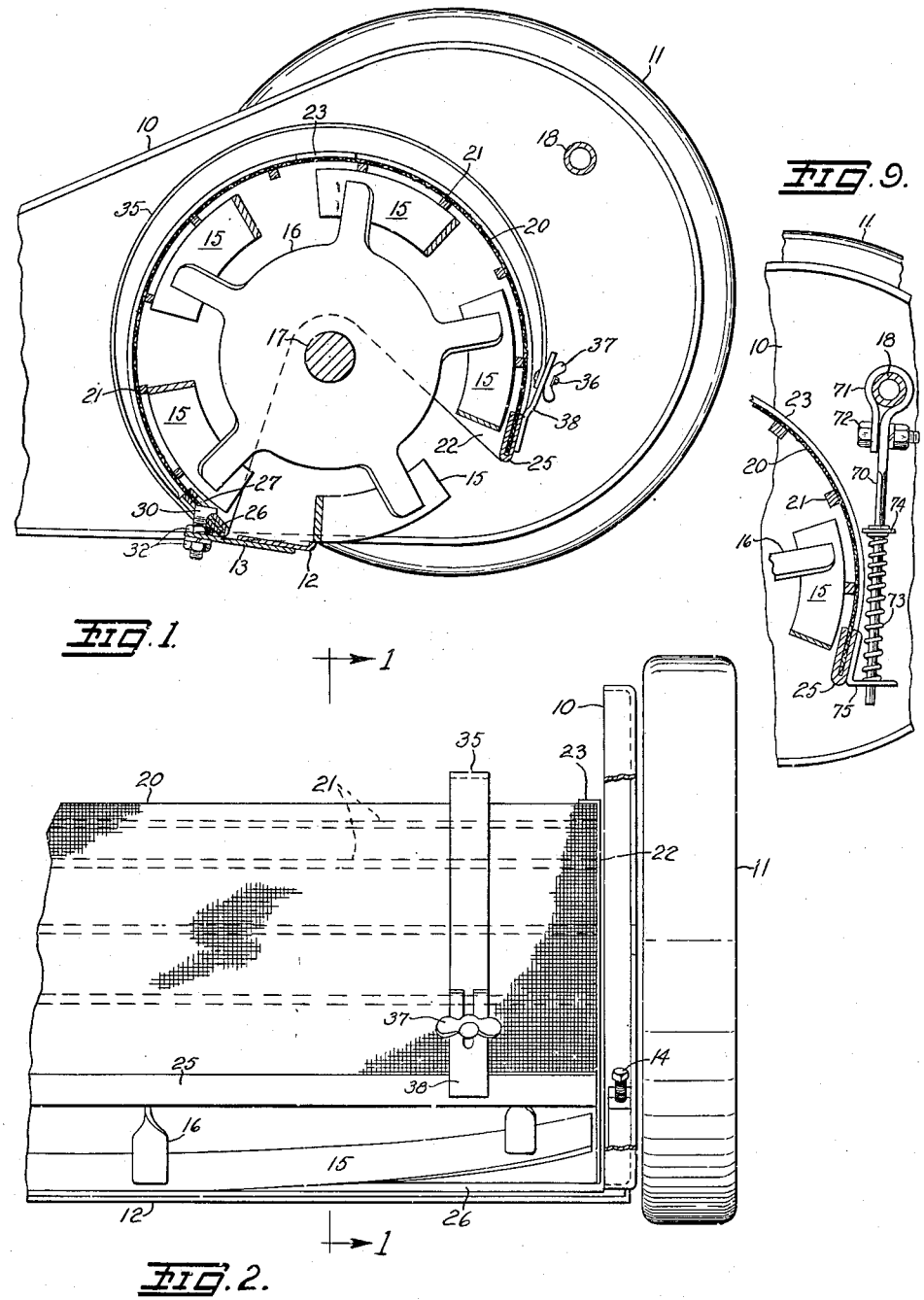

2,685,774

UNITED STATES PATENT OFFICE 2,685,774

GRASS MULCHING DEVICE FOR LAWN MOWERS

Ray C. Williams, Chicago, Ill.

Application March 25, 1950, Serial No. 151,878

22 Claims. (Cl. 56—249)

This invention relates to a device for use on lawnmowers to chop up the lawn clippings and deposit them back on the lawn for mulching purposes as the lawn is being mowed.

The general object of the invention is to provide a device of the type described for utilizing the lawn clippings as mulching so that the minerals and other valuable ingredients in grass clippings will be returned to the soil from which they were withdrawn instead of being removed according to the usual practice of raking up the clippings. Further objects are to provide a mulching device which will catch the grass clippings and cut them fine enough to make contained minerals available and to render the cut pieces inconspicuous when redeposited on the lawn, to provide a device which will deposit the finely chopped material at or near the roots of the growing grass where it will be out of sight and where it will be most effective as a mulch, to provide a mulch chopping device utilizing the cutting blades of the mower, and to provide a device of the type described which will perform its intended function without interfering with the normal operation of the lawnmower.

The present device comprises a flexible cylindrical casing surrounding the rotating blades of the lawnmower and containing a number of interior cutter ribs to coact with the lawnmower blades to repeatedly cut the grass clippings. The casing itself acts as a grass catcher for the clippings, causing them to pass between the rotating lawnmower blades and the relatively stationary cutter ribs for successive cutting actions until the clippings are reduced to a relatively fine state. The casing is arranged to deposit the finely comminuted clippings at the roots of the growing grass where the upstanding grass is bent rearwardly by the descending cutter blades as they approach the cutter bar of the lawnmower.

The rapid rotation of the cutter blades causes the comminuted grass to be impelled downwardly with a force considerably greater than that of gravity alone. After the grass has been cut a number of times by a lawnmower equipped with the present mulching device, sufficient cut grass is deposited close to the ground so that excessive evaporation of surface moisture is inhibited and moisture is retained in the ground closer to the surface. An appreciable reduction in the use of hydrant water for sprinkling results, and the growth and vitality of the grass is enhanced.

The foregoing and other objects and advantages of the invention will become apparent and the invention will be better understood from the following specification describing a preferred embodiment which is illustrated on the accompanying drawings. It is to be understood, however, that various changes may be made in the construction and arrangement of parts, and that certain features may be used without others without departing from the spirit of the invention.

In the drawings:

Figure 1 is a cross sectional view showing the device of the invention attached to a lawnmower on the plane I—I of Figure 2;

Figure 2 is a fragmentary front elevational view of a lawnmower and attachment embodying the invention.

Figure 3 is a fragmentary rear elevation view;

Figure 4 illustrates a different form of attaching means for securing the device to the lawnmower;

Figure 5 illustrates a permanent type of attachment;

Figure 6 shows a form of construction employing flared ribs on the casing of the device;

Figure 7 shows a form of construction utilizing tapered or relieved ribs;

Figure 8 is a fragmentary view illustrating the operation of the device; and

Figure 9 is a fragmentary view showing a different spring arrangement for holding the casing against the lawnmower rotor.

In the sectional view in Figure 1, the numeral 10 designates one of the side frames of a conventional lawnmower having a pair of wheels 11 at the opposite ends of a transverse cutter bar 12. The cutter bar 12 is mounted on a supporting and reinforcing plate or anchor bar 13 having the usual adjustment screws 14 to raise the cutter bar into the proper shearing relation to the rotating cutter blades 15. The blades 15 are mounted on spiders 16 on a shaft 17, which is driven in the usual manner either from the wheels 11 or from a small motor. Numeral 18 designates the front spacer bar. The parts thus far described comprise conventional lawnmower construction.

The device of the invention comprises a screen 20 which forms a generally cylindrical casing or shroud-like member surrounding the rotating blades and equipped on its inner surface with longitudinal ribs 21 to engage the blades. This casing is closed at one or both of its ends by means of end plates. In the illustrated embodiment there are a pair of end plates 22 which are cut away to fit over the shaft 17 of the lawnmower rotor. Each end plate 22 has a finger or tab 23 on its top side to overlie the screen, and a supporting tab 24 on its bottom side as shown in Figure 3. The front edge of the screen is attached to a reinforcing bar 25, and the rear edge of the screen is attached to a similar reinforcing bar 26. Bar 26 is welded at its ends to the tabs 24 of the two end plates. The bar 26 is provided with a number of holes 27 to receive the heads of lugs 30 which are adjustably mounted on the cutter bar reinforcing plate 13 as shown in Figure 3. The lugs 30 have threaded shanks passing through holes in the plate 13 whereby the lugs may be adjusted by means of nuts 32 to clamp the rear bar 26 of the screen 20 firmly against the plate 13.

Attached to the bar 26 near its opposite ends are a pair of arcuate spring members 35 which extend around the cylindrical surface of screen 20 in a bow at a slight distance therefrom. The forward end of each spring 35 carries a stud 36 equipped with a wing nut 37 which may be clamped in adjusted position on a slotted bracket 38 mounted on the bar 25. The two springs 35 tend to contract and thrust the front edge of the screen downwardly and rearwardly to hold all the cutter ribs 21 in engagement with the lawnmower blades 15.

In Figure 1 the whole device comprising casing screen 20, end plates 22 and springs 35 may be readily removed from the lawnmower by merely loosening the lugs 30 to release the bar 26.

Figures 4 and 5 show different arrangements for mounting the device on the lawnmower. In Figure 4 the rear bar of the screen 20 is made up of two pieces. The flat strip 26 is secured to a V-shaped strip 40 which is removably attached to the plate 13 by means of C-shaped clamps 41 having clamp screws 42 to hold the parts securely together. The V-shaped strip 40 is continuous for the length of strip 26 to add strength and stiffness and to close any possible gap between the screen and plate 13 through which coarse cut grass could escape.

In Figure 5 the bar 26 is attached to one leaf of a long piano hinge 45, the other leaf of which is secured to the plate 13 by means of bolts and nuts 46. In each case the casing screen 20, end plates 22 and springs 35 are carried directly by the bar 26 in the manner described. The piano hinge 45 has certain advantages over a more rigid means for holding the bar 26. By allowing movement of the casing or screen 20 at the hinge joint, it is possible to make a positive contact between the first longitudinal rib 21 and each blade 15 after the blade has passed the cutter bar 12. When the bar 26 is attached to the plate 13 in a more rigid manner, the bar 26 must be located with some care to make sure that the first rib 21 will contact the blades 15. However, because of the flexibility of the casing and the tension provided by the springs 35, the adjustment for proper contact is critical only to the first rib 21 and does not present a serious problem in any of the illustrated forms of connection.

It is necessary only that bar 26 be held firmly against reinforcing plate 13, and this may be accomplished by still other means.

It is necessary to make some provision to prevent the leading corners of the spiral mower blades 15 from catching on the ribs 21. In Figure 6 the extremities of the ribs 21 at one end of the casing are flared outwardly at 21a sufficiently to clear the leading ends of the blades 15.

In Figure 7 the desired result is achieved by relieving the ribs 21 with a slight taper at 21b extending back about two inches from the ends of the ribs. At their extremities the ribs 21 are reduced in height to the thickness of a circular runner 50 which abuts the ends of the ribs and surrounds the blades 15 at the extreme end of the screen 20. The blades 15 are thereby prevented from projecting between the ribs 21, while at the same time the taper at 21b tends to make the ends of the ribs clear the lawnmower blades in the same way as the flare 21a in Figure 6.

Figure 8 illustrates the action of the mulching device. When the lawnmower is moving to the right its cutting blades 15 rotate in the direction of arrow 55 to engage the upstanding grass and bend it down at 56 toward the advancing cutter bar 12. The numeral 57 designates clippings cut off by the previous blade which has just passed over the cutter bar. These clippings are confined closely around the rotating lawnmower blades by the casing screen 20 so that they are impelled around the casing with the lawnmower blades before they escape. In their travel around the casing screen 20 the clippings pass the various cutter ribs 21 in succession and are chopped into a finer and finer condition until they finally leave the casing in the form of very fine particles 58.

The bar 25 at the front edge of the casing is preferably of sufficient height just to clear the upstanding uncut grass 60, whereby the grass which is bent over at 56 is immediately behind this bar. Thus, the grass is parted at the point of discharge of the fine material 58 for the deposition of this fine material directly at the roots thereof. By thus distributing the finely chopped clippings around the roots of the uncut grass, the cutter bar 12 passes over the deposited clippings without picking them up and causing congestion in the mower. Also, by being deposited close to the ground, the clippings are substantially out of sight and are more effective as a mulch to retain surface moisture and have other beneficial effects upon the growing lawn grass.

It is not necessary for all of the finely cut grass 58 to pour into the space made available by the bending of the standing grass at 56. Any cuttings which may be deposited on top of growing grass will tend to filter down toward the ground, except for a certain amount which may not be cut sufficiently fine. These coarser cuttings which are held up by the standing grass are picked up again by the blades 15 and driven over the cutter bar 12 to be passed around the casing again and further reduced in size. This repeating action in comminuting the cuttings is of advantage in leveling off and distributing overloads which may occur in running through an area of dense growth.

It is also possible to hold the casing 20 in position by means other than the springs 35. In Figure 9, for example, a pair or more of rods 70 have flattened strap ends 71 encircling the front spacer bar 18 and secured thereto by clamping bolts 72. On each bar 70 a spring 73 has an upper end seated against a stop 74 and a lower end bearing against an ear 75 on the bar 25. The action of springs 73 thereby holds the casing 20 closely about the lawnmower rotor so that the blades 15 will engage the ribs 21.

The casing or screen 20 may comprise wire screening, canvas, or any other suitable semi-flexible material. An ideal casing would flex only in the direction of rotation of the blades and would be relatively rigid in the direction parallel to the shaft of the rotor. While a semi-flexible casing material is preferred, the whole casing may be a rigid assembly, but such a form of construction is not as desirable because it must be specially designed for, and fitted to, each particular make of lawnmower.

Having now described my invention and in what manner the same may be used, what I claim as new and desire to protect by Letters Patent is:

1. A grass mulching device for rotating blade lawnmowers, comprising means to confine the clippings from the mower closely around the rotating blades, means to subject the clippings while thus confined to repeated chopping action by said blades to reduce the clippings to a finely cut condition, said first named means having a downwardly directed opening for depositing the finely cut clippings in uncut grass as the latter is first engaged by said blades for cutting.

2. A grass mulching device for lawnmowers having a stationary cutter bar and rotatable cutting blades, comprising a generally cylindrical casing surrounding said blades, cutter means mounted within said casing in cooperative relation with said blades, means mounting one side of said casing on said cutter bar, and means supporting the other side of said casing on the forward side of said blades, the forward edge of said casing defining a downwardly directed opening for depositing the finely cut grass at the roots of uncut grass ahead of the mower.

3. A grass mulching device for a lawnmower having a relatively stationary cutter bar and rotating blades, comprising a flexible casing partially surrounding said blades, and cutter ribs mounted on the inside of said casing in cooperative relation with said blades, said casing holding said cutter ribs in yieldable engagement with said blades.

4. A grass mulching device for a lawnmower having a relatively stationary cutter bar and rotatable blades, comprising a flexible casing secured to said cutter bar and disposed around said blades, cutter ribs mounted in said casing, and spring means yieldably supporting said casing and cutter ribs in cooperative relation with said blades.

5. A grass mulching device for a lawnmower having a relatively stationary cutter bar and rotatable blades, comprising a screen partially surrounding said blades, cutter ribs on the inside of said screen in cooperative relation with said blades, means for mounting one edge of said screen on said cutter bar, and spring members secured adjacent said edge and extending around said screen and holding another edge of said screen in front of said blades.

6. A grass mulching device for a lawnmower having a rotatable reel of cutter blades, a generally cylindrical casing surrounding the cutter blades, a plurality of longitudinal cutter bars mounted interiorly of said casing for engagement by said blades as the reel is rotated, said cylindrical casing enclosing the back, top and front sides of said reel and having a discharge opening parallel to and adjacent the front of said reel for discharging mulched grass downwardly into uncut grass.

7. A grass mulching device for a lawnmower having a rotatable reel of cutter blades, a generally cylindrical shield enclosing the back, top and front sides of said reel and having a downwardly directed opening, a plurality of longitudinal cutter bars mounted interiorly of said shield for engagement by said blades as the reel is rotated, and means common to all of said cutter bars resiliently urging said cutter bars into cooperative relation with said blades.

8. A grass mulching device for a lawnmower having a rotatable reel of cutter blades, a generally cylindrical casing enclosing said reel, a plurality of cutter bars mounted interiorly of said casing for engagement by said blades as the reel is rotated, and common means resiliently urging all of said cutter bars into cooperative relation with said blades.

9. A grass mulching device for a lawnmower having a relatively stationary cutter bar and rotatable blades, comprising a flexible casing secured to said cutter bar and disposed around said blades, cutters bars mounted in said casing, means resiliently supporting said casing and cutter bars in cooperative relation with said blades, the forward edge of said casing defining a downwardly directed opening for depositing chopped grass ahead of the stationary cutter bar.

10. A device for cutting and chopping grass and the like having a plurality of rotatable cutting elements, a generally cylindrical casing to confine the material-in-process closely around the cutting elements, a plurality of bars mounted within said casing for engagement by said cutting elements, and spring means acting on said bars collectively for resiliently pressing all said bars against the cutting elements.

11. A grass mulching lawnmower having a rotatable reel of cutter blades, a generally cylindrical flexible shield enclosing the back, top and front sides of said reel and having a downwardly directed opening, a plurality of longitudinal cutter bars mounted interiorly of said shield for engagement by said blades as the reel is rotated, and spring means on said lawnmower resiliently urging said flexible shield toward the reel axis and said cutter bars into cooperative relation with said blades.

12. In a lawn mower of the character described, the combination of a frame having a pair of spaced ground engaging wheels, a stationary cutter bar carried by said frame and extending laterally between said wheels, a rotary cutter having a plurality of spiral blades arranged and adapted to cooperate with said stationary cutter bar to cut grass as said frame is moved thereover, a shroud-like member of flexible contruction attached at one edge to said frame adjacent said stationary cutter bar and extending over and in inwrapping engagement about said rotary cutter, and a plurality of laterally extending grass chopping ribs carried by said shroud-like member and disposed in grass chopping contact with a plurality of the spiral blades of said rotary cutter.

13. In a lawn mower of the character described, the combination of a frame having a pair of spaced ground engaging wheels, a stationary cutter bar carried by said frame and extending laterally between said wheels, a rotary cutter having a plurality of spiral blades arranged and adapted to cooperate with said stationary cutter bar to cut grass as said frame is moved thereover, a flexible shroud-like member attached at one edge to said frame adjacent said stationary cutter bar and extending over and in inwrapping engagement about said rotary cutter, a plurality of laterally extending grass chopping ribs carried by said shroud-like member and supported solely thereby in cutting relation with a plurality of the spiral blades of said rotary cutter, and means operating upon the trailing edge of said flexible shroud-like member for maintaining a tension therein.

14. In a lawn mower of the character described, the combination of a frame having ground engaging wheels, a stationary grass cutter bar carried by said frame and extending laterally thereof, a rotary cutter having a plurality of spiral blades arranged and adapted to cooperate with said stationary cutter bar to cut grass as said frame is moved thereover, an anchor bar carried by said frame adjacent said stationary grass cutter bar, a flexible shroud-like member attached at one edge to said anchor bar and disposed in trailing relation over and in inwrapping engagement about a plurality of the spiral blades of said rotary cutter, a plurality of longitudinally extending grass chopping ribs disposed within and carried by said shroud-like member in grass chopping relation with the spiral blades of said rotary cutter, and means at one end of said shroud-like member for guiding the spiral blades of said rotary cutter into proper cooperating relation with said grass chopping ribs.

15. In a grass cutting and mulching lawn mower, the combination of a chassis having supporting wheels adapted to be moved over a lawn, a rotary cutter having spiral blades extending across said chassis, a stationary grass cutter bar supported by said chassis in cooperating relation with the spiral blades of said rotary cutter, a semi-cylindrical shroud of flexible construction secured at one edge upon said chassis and disposed in trailing and overlapping relation upon said rotary cutter and under which the grass initially cut at said stationary bar will be entrapped, and a plurality of laterally extending grass chopping ribs secured to the inside of said shroud adapted and arranged to engage with the spiral blades of said rotary cutter and chop the grass entrapped therein, said shroud being extended over and supported by said rotary cutter for a distance sufficient to effect a redeposit of the chopped grass upon the lawn at a point immediately ahead of said stationary grass cutter bar.

16. In a grass cutting and mulching lawn mower, the combination of a chassis having supporting wheels adapted to be moved over a lawn, a rotary cutter having spiral blades extending laterally of said chassis, a stationary cutter bar supported by said chassis in cooperating relation with the spiral blades of said rotary cutter, a shroud-like member of flexible material secured at one edge upon said chassis adjacent said stationary bar and disposed in trailing relation over said rotary cutter into which the grass initially cut by said rotary cutter will be entrapped, a plurality of grass chopping ribs carried by said shroud-like member adapted and arranged to engage with the spiral blades of said rotary cutter and chop the grass entrapped therein, said shroud-like member being extended over said rotary cutter and supported thereby for a distance sufficient to effect a redeposit of the finely chopped grass upon the lawn at a point immediately in advance of said stationary cutter bar, and spring means operating upon the trailing edge of said shroud-like member for establishing a tension therein, whereby all of said grass chopping ribs will be maintained in engagement with the spiral blades of said rotary cutter.

17. In a grass cutting and mulching lawn mower, the combination of a wheeled chassis adapted to be moved over a lawn, a rotary cutter having a plurality of spiral blades carried by said chassis, a stationary cutter bar supported by said chassis in cooperating relation with the spiral blades of said rotary cutter, a shroud-like member of flexible material secured at one edge upon said chassis adjacent said stationary cutter bar and disposed in lapping relation over said rotary cutter, a plurality of grass chopping ribs secured to the inside surface of said shroud-like member adapted and arranged to ride over the spiral blades of said rotary cutter as said blades move relative thereto, said shroud-like member being extended over said rotary cutter for a distance sufficient to effect a redeposit of the chopped grass upon the lawn as a mulch in advance of said stationary cutter bar, and means connected to the other edge of said shroud-like member for establishing a tension therein that will insure a grass cutting contact between the grass chopping ribs carried thereby and the spiral blades of said rotary cutter.

18. A grass mulching attachment for lawn mowers, comprising a sheet of wire screening, means at one edge of said sheet of wire screening for securing it to a lawn mower frame adjacent the stationary grass cutter bar thereof and holding it in lapping relation over and about the rotary cutter element of the lawn mower, and means carried by said sheet of wire screening forming spaced laterally extending grass chopping bars with which the blades of said rotary cutter element will engage and chop the grass cut by the lawn mower, said sheet of wire screening being of a length that will extend over the rotary cutter element of the lawn mower to a point where the grass chopped by said chopping bar forming means will be discharged upon the lawn at a point in advance of said stationary grass cutter bar as the lawn mower is moved over a lawn.

19. An attachment for lawn mowers of the type having a stationary grass cutter bar and a rotary cutter with a plurality of spirally disposed cutting blades arranged to cooperate with said stationary cutter bar, comprising an anchor bar adapted to be attached to the frame of a lawn mower adjacent the stationary grass cutter bar thereof, a flexible shroud-like member secured at one edge to said anchor bar and adapted to be disposed in trailing relation over and supported solely by the rotary cutter of the lawn mower, and a plurality of laterally extending chopper bars arranged in spaced relation upon the inside of said shroud-like member and cooperating with the spiral blades of said rotary cutter, whereby grass after being cut at said stationary cutter bar by the spiral blades of said rotary cutter will be entrapped by said shroud-like member and subjected to a chopping action by said spiral blades as they move under said chopper bars.

20. In an attachment for lawn mowers of the character described having a stationary cutter bar and a cooperating rotary cutter with a plurality of spiral blades, the combination of an anchor bar having means for attachment to the frame of a lawn mower adjacent its stationary cutter bar, a flexible shroud secured at one edge to said anchor bar and adapted to extend in lapping relation over the rotary cutter of a lawn mower, a plurality of laterally extending grass chopping ribs positioned within and supported by said shroud in cutting relation with the spiral blades of the rotary cutter of the lawn mower, and means for positioning said grass chopping ribs into cooperating relation with the spiral blades of said rotary cutter as it revolves within said flexible shroud.

21. In a mulching attachment for lawn mowers of the type having a rotary cutter with spiral blades that cooperate with a stationary cutter bar to cut grass as the lawn mower is passed thereover, the combination of an anchor bar adapted to be attached to the chassis of the lawn mower adjacent its stationary cutter bar, a shroud-like member of flexible material secured along one edge to said anchor bar and adapted to extend in lapping relation over the rotary cutter of the lawn mower, a plurality of grass chopping ribs carried by said shroud-like member and arranged to engage with the spiral blades of the rotary cutter and chop the cut grass as it is carried into said shroud-like member by the rotary cutter, said shroud-like member being extended over the rotary cutter of the lawn mower for a distance sufficient to encompass a plurality of spiral blades of said rotary cutter and redeposit the finely chopped grass upon the lawn at a point in advance of the lawn mower as it progresses over the lawn, and a bow spring carried by said anchor bar extending over and engaging the trailing edge of said shroud-like member for establishing a tension in said shroud-like member, whereby all of said grass chopping ribs will be held in grass chopping engagement with the engaged spiral blades of said rotary cutter.

22. An attachment for lawn mowers of the type having a stationary grass cutter bar and a rotary cutter with a plurality of spirally disposed cutting blades arranged to cooperate with said stationary cutter bar, comprising an anchor bar adapted to be attached to a lawn mower adjacent its stationary grass cutter bar, an open mesh shroud-like member secured along one edge to said anchor bar and adapted to be supported by and in lapping relation over the rotary cutter of the lawn mower, a plurality of laterally extending chopper bars carried by and arranged in spaced relation within said shroud-like member and adapted to be engaged by the spiral blades of the rotary cutter of the lawn mower as it rotates, whereby grass after being severed at the stationary cutter bar by said rotary cutter will be subjected to a chopping action by said spiral blades as they move under said chopper bars, and a closure plate at the end of said shroud-like member for preventing the escape of grass.

References Cited in the file of this patent

UNITED STATES PATENTS

| Number | Name | Date |
|---|---|---|
| 1,155,353 | Haldemain | Oct. 5, 1915 |
| 1,819,133 | Stegeman et al. | Aug. 18, 1931 |
| 2,066,174 | Gregier | Dec. 29, 1936 |
| 2,197,295 | Cambridge | Apr. 16, 1940 |
| 2,486,969 | Nelson | Nov. 1, 1949 |